US012099380B2

(12) United States Patent
Kwak et al.

(10) Patent No.: US 12,099,380 B2
(45) Date of Patent: Sep. 24, 2024

(54) DISPLAY APPARATUS COMPRISING A CAMERA MODULE INSERTED INTO AN OPENING OF AN ARRAY SUBSTRATE THAT IS SUPPORTED BY A LENS HOLE GUIDE

(71) Applicant: LG Display Co., Ltd., Seoul (KR)

(72) Inventors: Jinwook Kwak, Busan (KR); Julk Hong, Gyeongsangbuk-do (KR); Jangcheol Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/431,773

(22) Filed: Feb. 2, 2024

(65) Prior Publication Data

US 2024/0176388 A1    May 30, 2024

Related U.S. Application Data

(63) Continuation of application No. 17/981,329, filed on Nov. 4, 2022, now Pat. No. 11,921,539, which is a
(Continued)

(30) Foreign Application Priority Data

Dec. 28, 2015    (KR) .......................... 10-2015-0187173

(51) Int. Cl.
*G06F 1/16*    (2006.01)
*G02F 1/133*    (2006.01)
(Continued)

(52) U.S. Cl.
CPC .......... *G06F 1/1605* (2013.01); *G02F 1/1333* (2013.01); *G02F 1/133512* (2013.01);
(Continued)

(58) Field of Classification Search
CPC ......................................... G02F 2001/134345
See application file for complete search history.

(56) References Cited

U.S. PATENT DOCUMENTS

| 2005/0264689 A1 | 12/2005 | Yang et al. |
| 2010/0309369 A1 | 12/2010 | Jarvis et al. |
| (Continued) | | |

FOREIGN PATENT DOCUMENTS

| AU | 2013200511 B2 | 12/2014 |
| CN | 102087539 A | 6/2011 |
| (Continued) | | |

OTHER PUBLICATIONS

First Notification of Office Action dated Mar. 3, 2020 for corresponding Chinese Patent Application No. 201611035761.6.
(Continued)

*Primary Examiner* — Paul C Lee
(74) *Attorney, Agent, or Firm* — Morgan, Lewis & Bockius LLP

(57) ABSTRACT

A liquid-crystal display (LCD) device includes: an array substrate on which a sub-pixel is disposed; a color filter substrate on which a color filter corresponding to the sub-pixel is disposed; and a liquid-crystal layer between the array substrate and the color filter substrate. The array substrate comprises a lens hole, the color filter substrate comprises a lens hole guide, and a diameter of the lens hole is smaller than an inner diameter of the lens hole guide.

14 Claims, 7 Drawing Sheets

Related U.S. Application Data continuation of application No. 16/933,520, filed on Jul. 20, 2020, now Pat. No. 11,520,374, which is a continuation of application No. 16/403,081, filed on May 3, 2019, now Pat. No. 10,754,373, which is a continuation of application No. 15/346,935, filed on Nov. 9, 2016, now Pat. No. 10,334,148.

(51) Int. Cl.

| | | |
|---|---|---|
| G02F 1/1333 | (2006.01) | |
| G02F 1/1335 | (2006.01) | |
| G02F 1/1339 | (2006.01) | |
| H04N 23/50 | (2023.01) | |
| H04N 23/51 | (2023.01) | |
| H04N 23/57 | (2023.01) | |

(52) U.S. Cl.
CPC .......... *G06F 1/1637* (2013.01); *G06F 1/1686* (2013.01); *G02F 1/13312* (2021.01); *G02F 1/133388* (2021.01); *G02F 1/133514* (2013.01); *G02F 1/1339* (2013.01); *H04N 23/50* (2023.01); *H04N 23/51* (2023.01); *H04N 23/57* (2023.01)

(56) References Cited

U.S. PATENT DOCUMENTS

| | | |
|---|---|---|
| 2010/0315570 A1 | 12/2010 | Matthew et al. |
| 2011/0076005 A1 | 3/2011 | Guo |
| 2011/0134255 A1 | 6/2011 | Kim et al. |
| 2011/0261283 A1 | 10/2011 | Kim et al. |
| 2012/0069241 A1 | 3/2012 | Shiau et al. |
| 2012/0105400 A1 | 5/2012 | Matthew et al. |
| 2012/0127487 A1 | 5/2012 | Potapenko |
| 2012/0145077 A1 | 6/2012 | Chang et al. |
| 2012/0206669 A1 | 8/2012 | Kim et al. |
| 2012/0243091 A1* | 9/2012 | Amm .................... G06F 1/1647 359/489.07 |
| 2012/0327325 A1 | 12/2012 | Park et al. |
| 2013/0176512 A1* | 7/2013 | Posner .................. G02F 1/1333 349/193 |
| 2013/0258234 A1* | 10/2013 | Park .................. G02F 1/133528 349/58 |
| 2013/0265521 A1 | 10/2013 | Chen et al. |
| 2013/0328051 A1* | 12/2013 | Franklin .......... G02F 1/133308 361/679.01 |
| 2014/0063406 A1* | 3/2014 | Park .................. G02F 1/133308 349/106 |
| 2014/0063407 A1 | 3/2014 | Kwon et al. |
| 2014/0184521 A1 | 7/2014 | Kwong et al. |
| 2014/0225131 A1* | 8/2014 | Benson .................. G06F 1/1643 257/82 |
| 2014/0293173 A1 | 10/2014 | Koito et al. |
| 2016/0198070 A1 | 7/2016 | Nakano et al. |
| 2017/0068287 A1* | 3/2017 | Jung ...................... G02B 1/111 |

FOREIGN PATENT DOCUMENTS

| | | |
|---|---|---|
| CN | 102841457 A | 12/2012 |
| CN | 103676332 A | 3/2014 |
| CN | 104865761 A | 8/2015 |
| CN | 108427226 A | 8/2018 |
| CN | 110596939 A | 12/2019 |
| JP | 2012-098726 A | 5/2012 |
| JP | 2012-257162 A | 12/2012 |
| JP | 2013-045103 A | 3/2013 |
| JP | 2014081653 A | 5/2014 |
| JP | 6807007 B1 | 1/2021 |
| KR | 10-2012-0119082 A | 10/2012 |
| KR | 10-2013-0027335 A | 3/2013 |
| TW | 201214361 A | 4/2012 |

OTHER PUBLICATIONS

Dong Dai et al., Key Techniques for Liquid Crystal Display in Space, Chinese Journal of Liquid Crystal and Displays, Jun. 30, 2009, pp. 377-382, China. (English abstract on last page.).

Extended European Search Report dated Apr. 28, 2017 for corresponding European Patent Application No. 16197689.9.

* cited by examiner

DISPLAY APPARATUS COMPRISING A CAMERA MODULE INSERTED INTO AN OPENING OF AN ARRAY SUBSTRATE THAT IS SUPPORTED BY A LENS HOLE GUIDE

CROSS-REFERENCE TO RELATED APPLICATIONS

This application is a continuation of U.S. patent application Ser. No. 17/981,321, filed Nov. 4, 2022, which is a continuation of Ser. No. 16/933,520, filed Jul. 20, 2020, which is a continuation of U.S. patent application Ser. No. 16/403,081, filed May 3, 2019, which is a continuation of U.S. patent application Ser. No. 15/346,935, filed Nov. 9, 2016, which claims the benefit of Korean Patent Application No. 10-2015-0187173 filed on Dec. 28, 2015, in the Korean Intellectual Property Office, all of which are hereby incorporated by reference for all purposes as if fully set forth herein.

BACKGROUND

Technical Field

The present disclosure relates to a liquid-crystal display (LCD), and more particularly, to a liquid-crystal display device including a lens hole for a camera module and a method of fabricating the same.

Description of the Related Art

An LCD device is a transmissive display device and includes a liquid-crystal panel and a backlight unit. The liquid-crystal panel includes an array substrate for controlling a liquid-crystal layer, a polarization plate disposed on a surface of the array substrate, a color filter substrate facing the array substrate, a polarization plate disposed on a surface of the color filter substrate, and the liquid-crystal layer disposed between the array substrate and the color filter substrate. The liquid-crystal panel controls the liquid-crystal layer to thereby adjust transmittance of each of sub-pixels of the liquid-crystal panel.

The backlight unit includes optical sheets, a light guide plate, a light source unit, a reflective plate, and a guide panel. The optical sheets are disposed between the liquid-crystal panel and the light guide plate. For example, the optical sheets may include a prism film and/or a diffusion film. The light source is disposed on the side surface of the light guide plate, such that light is diffused through the light guide plate. The reflective plate is disposed on the bottom surface of the light guide plate to reflect light leaking toward the reflective plate. The guide panel supports the optical sheets, the light guide plate, the light source and the reflective plate, etc., to allow the liquid-crystal panel to be stably mounted thereon.

SUMMARY

The inventors of the application have studied and developed an LCD device into which a camera module (or portion thereof), a user-pressable button, etc. can be inserted.

The inventors of the application have devised an LCD device with minimal thickness and having a lens hole in an array substrate of the LCD device, into which a lens unit of a camera module or some other functional element can be inserted. Specifically, the lens hole is formed in the array substrate with a drill or similar equipment.

However, the present inventors recognized many problems caused during the process of forming such hole. For example, the hole itself or portions of the substrate may be damaged during the drilling process.

Further, after certain elements on a surface of the array substrate are formed, the desired hole may need to be formed at a location having several transparent material layers respectively having different refractive indexes. Accordingly, there may be an error in measuring the precise depth or thickness at the location where the hole is to be formed, such that the substrate may be damaged when the lens hole is formed with the drill or similar equipment based on inaccurate thickness measurements. The thinness of the substrate, which may or may not have certain layers thereon, requires very precise hole drilling. Doing so needs to be based upon accurate substrate thickness measurements, in order to prevent inaccurate drilling (i.e. over-drilling or under-drilling) and to minimize roughness or burrs at the inner surface of the hole.

Accordingly, the present invention is directed to a camera module integrated liquid crystal display device and manufacturing method thereof that substantially obviate one or more of the problems due to limitations and disadvantages as described above.

An object of the present disclosure is to provide an LCD device with minimal thickness to receive a camera module inserted thereinto while suppressing damages to the substrate that may occur during the fabricating process, and a method of fabricating the same.

Additional features and advantages of the invention will be set forth in the description that follows, and in part will be apparent from the description, or may be learned by practice of the invention. The objectives and other advantages will be realized and attained by the exemplary structures and methods particularly pointed out in the written description, and claims hereof as well as the appended drawings.

To achieve these and other advantages and in accordance with the inventive concepts as embodied and broadly described, a liquid-crystal display (LCD) device comprises an array substrate on which a sub-pixel is disposed; a color filter substrate on which a color filter corresponding to the sub-pixel is disposed; and a liquid-crystal layer between the array substrate and the color filter substrate. The array substrate comprises a lens hole, the color filter substrate comprises a lens hole guide, and a diameter of the lens hole is smaller than an inner diameter of the lens hole guide.

In another aspect, a method of fabricating a liquid-crystal display (LCD) device comprises measuring a thickness of an array substrate with a confocal sensor by using a measurement pattern on the array substrate; forming a groove in a position where a lens hole is to be formed to a depth determined based on the thickness of the array substrate measured with the confocal sensor; attaching a glass core to a region where the groove is formed by applying adhesion with a taping equipment, and then separating the glass core from the array substrate with the taping equipment to thereby form the lens hole; and inserting a camera module into the array substrate through the lens hole.

Particulars in the exemplary embodiments of the present disclosure will be described in the detail description with reference to the accompanying drawings.

According to an exemplary embodiment of the present disclosure, the thickness of an LCD device can be reduced even if a camera module is inserted thereinto by way of forming a lens hole in the array substrate to insert the camera module into the lens hole.

In addition, according to an exemplary embodiment of the present disclosure, a lens part is inserted into the lens hole and the lens hole guide, such that the camera module can capture images through a color filter substrate.

Further, according to an exemplary embodiment of the present disclosure, a lens hole guide is formed around the lens hole, such that damage to the array substrate can be suppressed by the lens hole guide during the process of forming the lens hole in the array substrate.

Moreover, according to an exemplary embodiment of the present disclosure, defects during the process of forming the lens hole can be reduced by a measurement pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
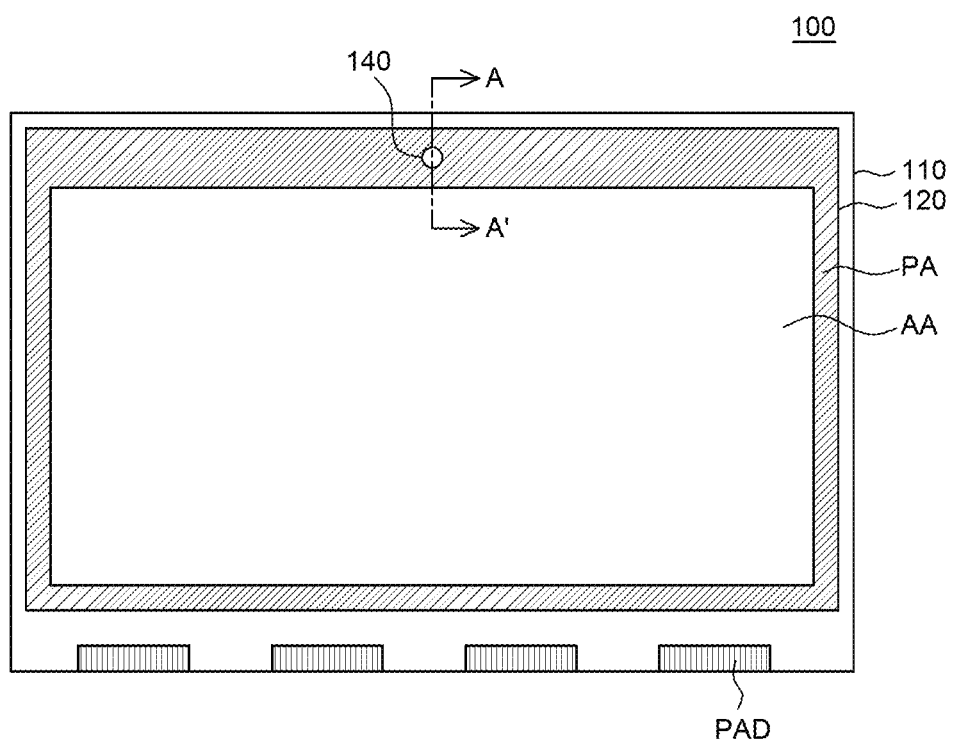
FIG. 1 is a schematic plan view of an LCD device according to an exemplary embodiment of the present disclosure.

Reference will now be made in detail to some embodiments of the present invention, examples of which are illustrated in the accompanying drawings.

The figures, dimensions, ratios, angles, the numbers of elements given in the drawings are merely illustrative and are not limiting. Like reference numerals denote like elements throughout the descriptions. Further, in describing the present disclosure, descriptions on well-known technologies may be omitted in order not to unnecessarily obscure the gist of the present disclosure. It is to be noticed that the terms "comprising," "having," "including" and so on, used in the description and claims, should not be interpreted as being restricted to the means listed thereafter unless specifically stated otherwise. Where an indefinite or definite article is used when referring to a singular noun, e.g. "a," "an," "the," this includes a plural of that noun unless specifically stated otherwise.

In describing elements, they are interpreted as including error margins even without explicit statements.

In describing positional relationship, such as "an element A on an element B," "an element A above an element B," "an element A below an element B," and "an element A next to an element B," another element C may be disposed between the elements A and B unless the term "directly" or "immediately" is explicitly used.

As used herein, a phrase "an element A on an element B" refers to that the element A may be disposed directly on the element B and/or the element A may be disposed indirectly on the element B via another element C.

The terms first, second and the like in the descriptions and in the claims are used for distinguishing between similar elements and not necessarily for describing a sequential or chronological order. Theses terms are used to merely distinguish one element from another. Accordingly, as used herein, a first element may be a second element within the technical idea of the present disclosure.

Like reference numerals denote like elements throughout the descriptions. The drawings are not to scale and the relative dimensions of various elements in the drawings are depicted schematically and not necessarily to scale.

Features of various exemplary embodiments of the present disclosure may be combined partially or totally. As will be clearly appreciated by those skilled in the art, technically various interactions and operations are possible. Various exemplary embodiments can be practiced individually or in combination.

FIG. 1 is a schematic plan view of an LCD device according to an exemplary embodiment of the present disclosure.

With reference to FIG. 1, an LCD device 100 according to an exemplary embodiment of the present disclosure may include a pixel area AA in which a plurality of pixels is disposed, and a peripheral area PA surrounding the pixel area AA. In the peripheral area PA, a pad unit PAD is disposed such that a variety of driver units are attached thereon. For example, a gate driver or a data driver may be attached thereto. In addition, a camera module 140 is inserted in the periphery area PA.

Figure 2:
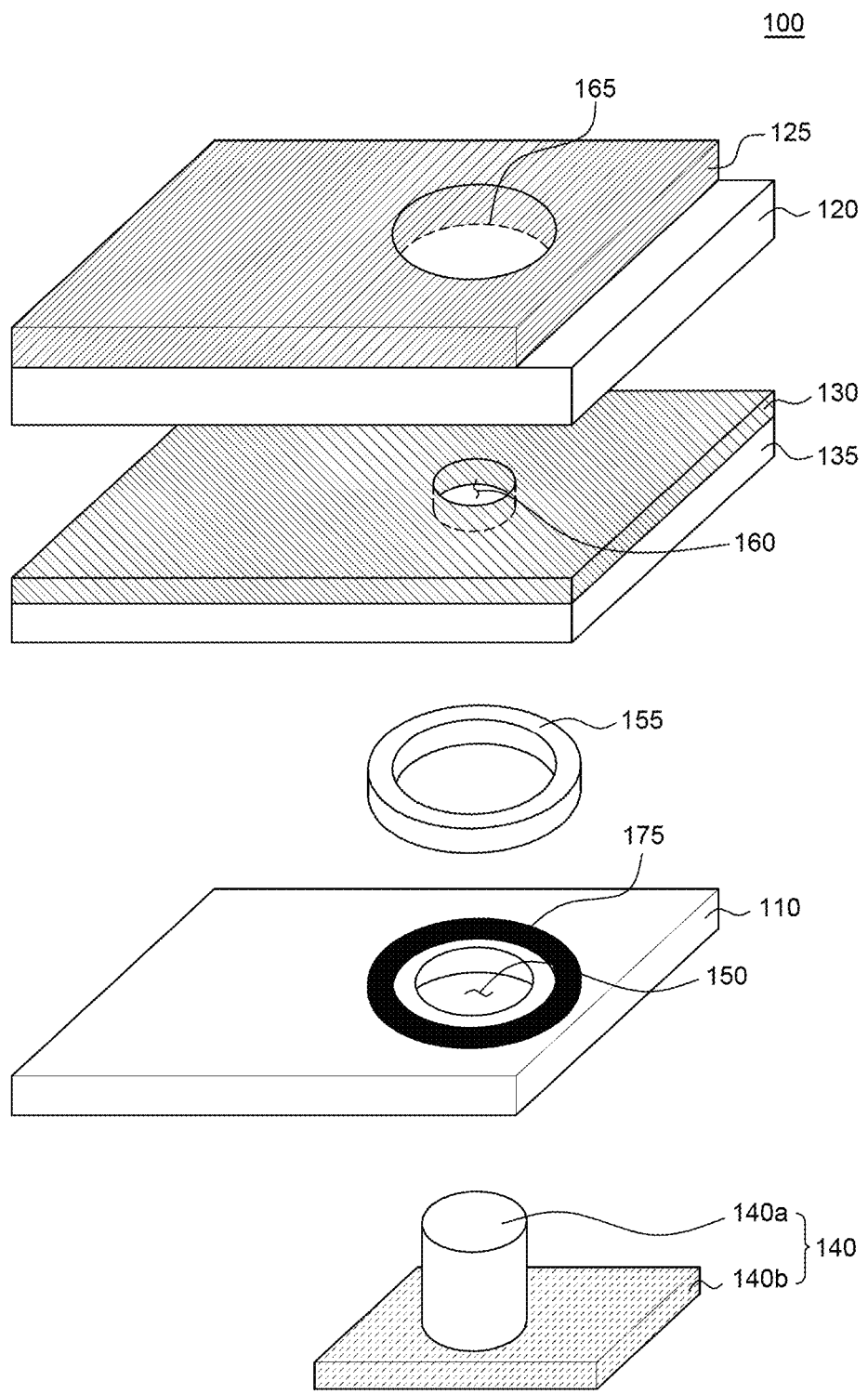
FIG. 2 is a schematic perspective view of an LCD device and a camera module according to an exemplary embodiment of the present disclosure.

FIG. 2 is a schematic perspective view of an LCD device and a camera module according to an exemplary embodiment of the present disclosure.

With reference to FIG. 2, the LCD device 100 according to the exemplary embodiment of the present disclosure includes an array substrate 110, a lens hole 150 formed in the array substrate 110, a measurement pattern 175 disposed around the lens hole 150, a lens hole guide 155 in line with the lens hole 150, an overcoat layer 135 disposed above the lens hole guide 155, a black matrix 130 disposed on the overcoat layer 135 and including an aperture 160 in line with the lens hole 150, a color filter substrate 120 disposed on the black matrix 130, and a second polarization plate 125 disposed on the color filter substrate 120 and having a transparent portion 165.

The camera module 140 can include a lens part 140a and a sensor part 140b. The lens 140a (or a portion thereof) is inserted into the lens hole 150.

The lens part 140a can include a lens and a guide for supporting the lens. The lens part 140a may have a cylindrical shape. However, this is merely illustrative.

The sensor part 140a can include an image sensor for converting an image having passed the lens part 140a into an electric signal, and a circuit board on which the image sensor is disposed. However, this is merely illustrative.

The camera module 140 (or a portion thereof) is inserted into the lens hole 150 on the array substrate 110. The LCD device 100 has an advantage in that the overall thickness or space occupied by the camera module 140 can be reduced by inserting the camera module 140 into the lens hole 150.

The lens part 140a is inserted into the lens hole 150 and the lens hole guide 155. Accordingly, there is an advantage in that the camera module 140 can capture images via the aperture 160.

Figure 3:
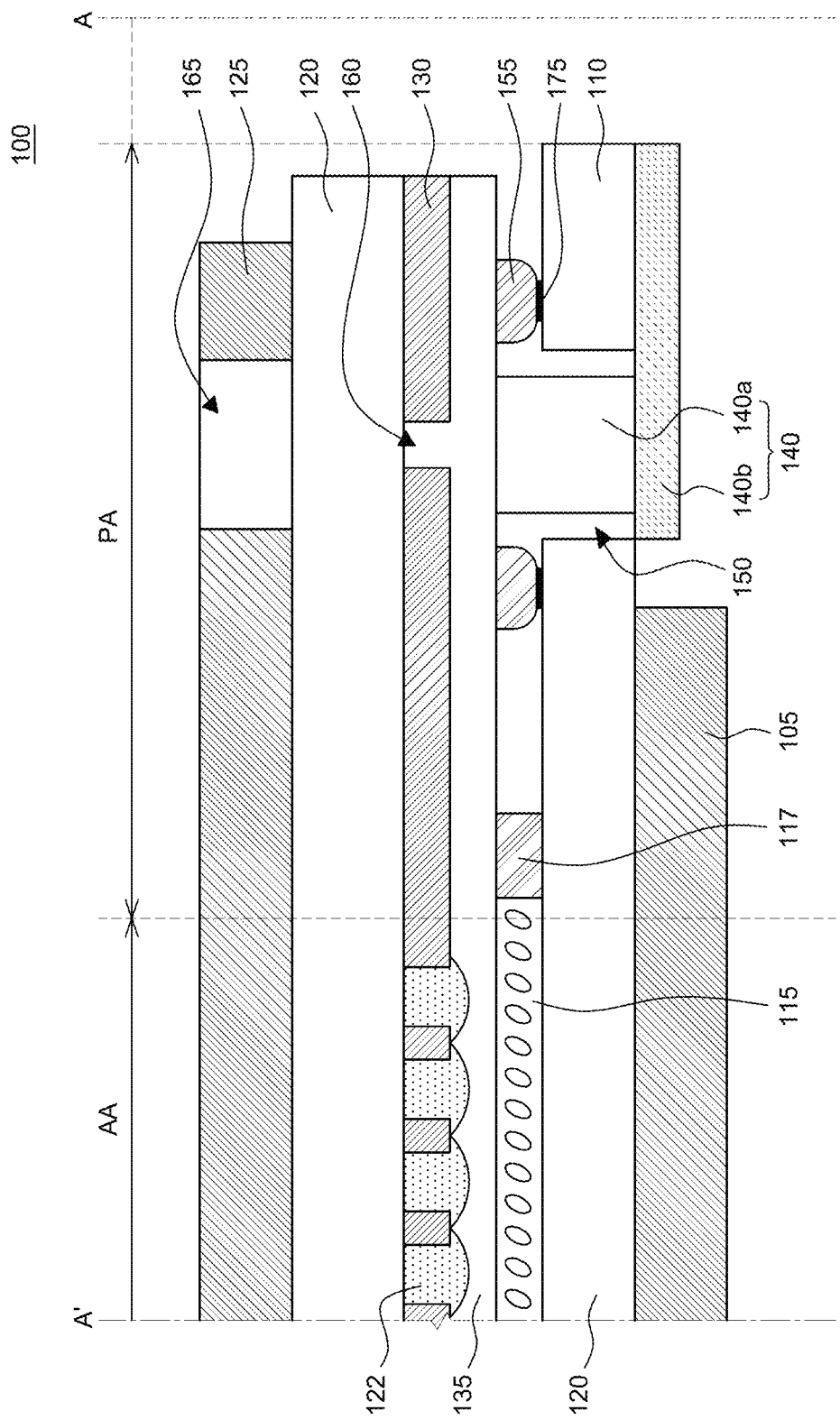
FIG. 3 is a cross-sectional view taken along line A-A and a camera

FIG. 3 is a cross-sectional view taken along line A-A' of FIG. 1.

Figure 4:
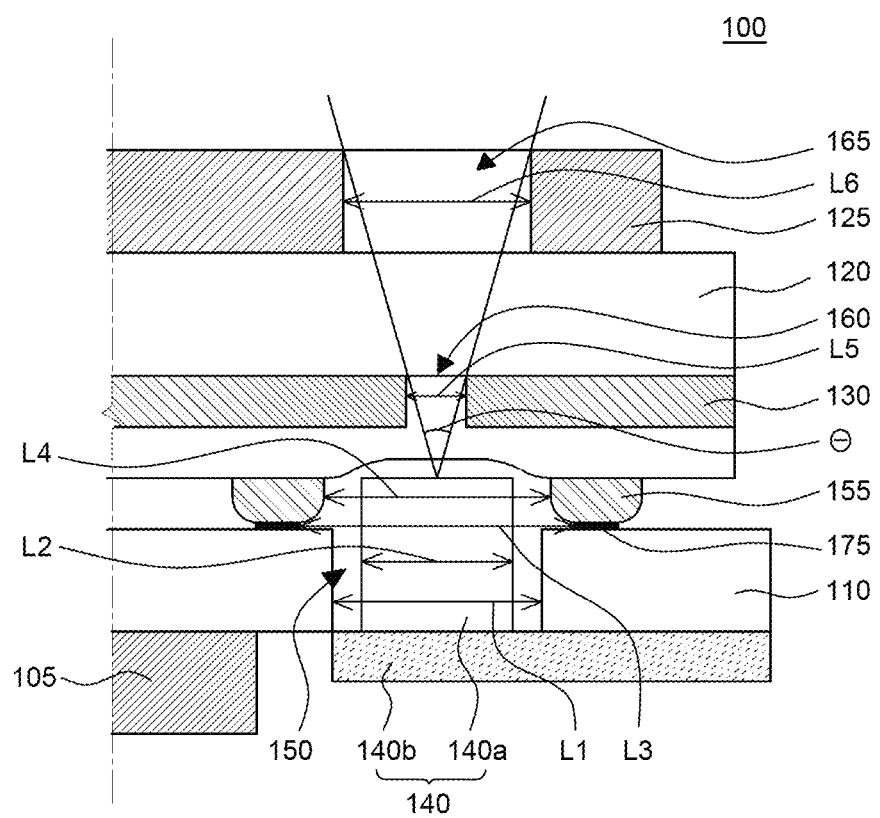
FIG. 4 is an enlarged cross-sectional view of FIG. 3.

FIG. 4 is an enlarged, cross-sectional view of FIG. 3.

With reference to FIGS. 3 to 4, the LCD device 100 according to the exemplary embodiment of the present disclosure includes the array substrate 110 including the lens hole 150 and the color filter substrate 120 including the aperture 160. The camera module 140 is inserted into the lens hole 150 of the LCD device 100. A first polarization plate 105 may be disposed on the bottom surface of the array substrate 110 and may polarize light supplied from the light source unit.

A liquid-crystal layer 115 is disposed between the array substrate 110 and the color filter substrate 120. Liquid-crystal molecules in the liquid-crystal layer 115 are tilted by signals applied from pixel electrodes and common electrodes of a sub-pixel. As the liquid-crystal molecules are tilted, transmittance of each of the sub-pixels of the LCD device 100 is adjusted.

A sealant 117 surrounds the outer periphery of the liquid-crystal layer 115 disposed between the array substrate 110. and the color filter substrate 120. Accordingly, the liquid-crystal layer 115 is sealed by the sealant 117.

The second polarization plate 125 may be disposed on the top surface of the color filter substrate 120 and may absorb polarized light depending on a tilt angle of the polarization axis of the light polarized by the liquid-crystal layer 115.

The LCD device 100 may include a pixel area AA and a peripheral area PA.

A sub-pixel for driving the liquid-crystal layer 115 is disposed on the array substrate 110 in the pixel area AA. The sub-pixel may include: a pixel electrode; a common electrode corresponding to the pixel electrode; a data line configured to apply image signals to the pixel electrode; a gate line configured to apply a turn-on signal to the pixel electrode; a switching element configured to apply image signals to the pixel electrode by receiving the signal applied from the gate line and the data line; insulation films for insulating elements from one another; and an alignment layer disposed on the liquid-crystal layer 115 to align liquid-crystal molecules in the liquid-crystal layer 115. It is to be noted that the LCD device 100 according to the exemplary embodiment of the present disclosure are not limited by the elements of the pixel area AA. A color filter 122 and the black matrix 130 are disposed on the color filter substrate 120 in the pixel area AA. The color filter 122 may include red, green and blue color filters. The black matrix separates the color filters 122 from one another. The overcoat layer 135 covers the color filter 122 and the black matrix 130 to reduce or planarize the step difference created by the color filter 122 and the black matrix 130. An alignment layer may be disposed between the overcoat layer 135 and the liquid-crystal layer 115 to align the liquid-crystal molecules. It is to be noted that the LCD device 100 according to the exemplary embodiment of the present disclosure are not limited by the elements of the pixel area AA.

In some embodiments of the present disclosure, the common electrode may be formed on the color filter substrate. For example, for a vertical alignment (VA) or twisted nematic (TN) LCD device, the common electrode may be formed on the color filter substrate.

In some embodiments of the present disclosure, the color filter may be included in a sub-pixel. For example, for a color-filter on thin-film-transistor (COT) LCD device, the color filter may be formed on the array substrate.

A variety of drivers may be disposed on the array substrate 1110 in the peripheral area PA. The drives may include a gate driver configured to apply signals to the gate lines, and a data driver configured to apply signals to the data lines. The drivers may be attached to the pad unit PAD formed in the periphery area PA by a conductive adhesive or may be formed together with switching elements on the array substrate during the process of forming the same. It is to be noted that the LCD device 100 according to the exemplary embodiment of the present disclosure is not limited by the drivers and the pad unit.

The lens hole 150 (or similar aperture or opening for accommodating some element) may be formed in the array substrate 110 in the peripheral area PA. More than one lens hole 150 may be formed. The camera module 140 may be inserted into the lens hole 150.

The lens hole 150 may be formed by penetrating the array substrate 110 with a drill or similar equipment. The drill may have a tip made of diamond. The tip of the drill may have a ring shape and may form a ring or hole in the array substrate 110 as it rotates at high speed. The diameter L1 of the lens hole 150 may be determined depending on the diameter of the drill. For example, the diameter L1 of the lens hole 150 may range from 4 mm to 6 mm. However, this is merely exemplary.

The camera module 140 may be inserted into the lens hole 150. The camera module 140 includes the lens part 140a and the sensor part 140b.

The lens part 140a may include a lens and a mold for supporting the lens. The lens part 140a has a viewing angle. The lens part 140a may have a cylindrical shape. It is to be noted that the shape of the lens part 140a is not limited to the cylindrical shape but may have different shapes depending on the shape of the mold.

The lens hole 150 may have a shape corresponding to the lens part 140a. That is, the lens hole 150 conforms to the lens part 140a so that the lens part 140a or a portion thereof can be inserted into the lens hole 150. For example, if the lens part 140a has a circular shape, the lens hole 150 may also have the circular shape. The diameter L1 of the lens hole 150 may be equal to or larger than the diameter L2 of the outer side surface of the lens part 140a of the camera module 140. With the above-described configuration, the lens part 140a may be inserted into the lens hole 150. Accordingly, the thickness of the LCD device 100 including the camera module 140 can be reduced.

The sensor part 140b may include a circuit board and an image sensor. The sensor part 140b converts images captured by the lens part 140a into electric signals. The image signals output from the sensor part 140b may be transmitted to another system via lines.

The measurement pattern 175 (or similar element configured to improve measurements) is disposed at, near, or around the lens hole 150 in the array substrate 110. The measurement pattern 175 may have a shape corresponding to the lens hole 150. In order to form the lens hole 150 in the array substrate 110, it is necessary to measure the thickness of the array substrate 110 at a location where the hole is to be formed. Specifically, since there may be minute deviations in the overall thickness of the array substrate 110, it may be necessary to measure the precise thickness where the hole is to be formed.

The thickness of the array substrate 110 may be measured with a confocal sensor or some other measuring equipment. In addition, it is also necessary to reduce measurement errors in measuring the thickness of the array substrate 110 with a confocal sensor.

The measurement pattern 175 may be made of at least one of metal materials of the gate line or the data line on the array substrate 110. For example, the measurement pattern 175 may be made of at least one of copper, aluminum, molybdenum and titanium. With the above-described configuration, no additional process is required for forming the measurement pattern 175, and thus the measurement pattern 175 can be formed by modifying a shape of a mask. Accordingly, an additional mask may not be required to form the measurement pattern 175.

The measurement pattern 175 is disposed on the top surface of the array substrate 110. Accordingly, by measuring the distance from the bottom surface of the array substrate 110 to the measurement pattern 175, the thickness of the array substrate 110 and how deep the array substrate 110 has to be drilled for forming the lens hole 150 can be measured.

The measurement pattern 175 may have a shape corresponding to the lens hole 150. For example, the measurement pattern 175 may have a circular shape, such as a ring or a donut shape if the lens hole 150 has a circular shape. The measurement pattern 175 has a particular width and/or diameter. For example, the width of the ring-like measurement pattern 175 may range from 200 μm to 700 μm. It is to be noted that the LCD device 100 according to the exemplary embodiment of the present disclosure is not limited by the width and/or diameter of the measurement pattern 175.

With the above-described configuration, the thickness of the array substrate 110 can be measured more accurately using a confocal sensor by measuring the thickness of the array substrate 100 having the measurement pattern 175 at the hole formation location.

For example, the thickness of the array substrate 110 may range from 150 μm to 400 μm. More specifically, if the thickness of the array substrate 110 is 250 μm, for example, the confocal sensor measures the distance from the bottom surface of the array substrate 110 to the measurement pattern 175 disposed on the top surface of the array substrate 110. Accordingly, the thickness of the array substrate 110 can be measured more accurately when compared to the thickness measurement performed without the measurement pattern 175.

The measurement pattern 175 is made of a metal material and thus is opaque. Accordingly, measurement error of the confocal sensor can be reduced by use of the measurement pattern 175. The shape of the measurement pattern 175 is not limited to those described above but may have a variety of shapes as long as measurements with the confocal sensor can be more accurately performed.

Without the measurement pattern 175, there are only transparent materials at and around the lens hole location of the LCD device. Accordingly, it is difficult to accurately measure the thickness of the array substrate with just the confocal sensor. Due to such inaccurate measurements, the hole formed in the array substrate 110 with the drill may be too shallow. As a result, the lens hole may not be formed as desired.

On the other hand, the hole formed in the array substrate 110 with the drill may be too deep. Specifically, the hole may reach the black matrix 130 formed on the color filter substrate 120. As a result, glass pieces or debris may be generated when the lens hole 150 is formed, and defects due to such foreign matter may occur. In addition, the black matrix 130 may be damaged. As a result, light may leak from the damaged black matrix 130.

The inner diameter L3 of the measurement pattern 175 may be larger than the diameter L1 of the lens hole 150. With the above-described configuration, the measurement pattern 175 does not come in contact with the drill even if the lens hole 150 is formed by the drill because the inner diameter L3 of the measurement pattern 175 is larger than the diameter of the drill. Accordingly, the measurement pattern 175 is not damaged by the drill.

In some embodiments of the present disclosure, the outer diameter of the measurement pattern 175 may be equal to or smaller than the diameter L1 of the lens hole 150. With the above-described configuration, the measurement pattern 175 can be effectively removed during the process of forming the lens hole 150 with the drill because the outer diameter of the measurement pattern 175 is smaller than the diameter of the drill. Specifically, the thickness of the array substrate 110 is more accurately measured with the confocal sensor with respect to the measurement pattern 175, and then the lens hole 150 is formed in the array substrate 100 with the drill based on the accurately measured thickness. That is, the measurement pattern may be removed once the thickness of the array substrate 110 has been measured. Accordingly, the measurement pattern may be removed during the process of forming the lens hole 150. Alternatively, only a part of the measurement pattern may be removed while the rest may remain around the lens hole 150.

The lens hole guide 155 in line with the lens hole 150 is formed in the color filter substrate 120 in the peripheral area PA. The lens hole guide 155 is in line with the lens hole 150. The lens hole guide 155 may support the array substrate 110 around the lens hole 150. For example, if the lens part 140a of the camera module 140 is a cylindrical shape, the lens hole 150 may be a circular shape, and the inner side of the lens hole guide 155 may also be the circular shape. The center of the lens hole 150 may be adjacent to or in line (i.e. aligned) with the center of the lens hole guide 155. The lens hole guide 155 is made of an organic material or an inorganic material.

Specifically, the array substrate 110 is ground by a drill during the process of forming the lens hole 150 with the drill. The array substrate 110 may be made of glass. There may be space between the array substrate 110 and the color filter substrate 120. As the array substrate 120 receives pressure from the drill process, undesired physical impact may be exerted onto the array substrate 120. As a result, the array substrate 120 may be undesirably bent and cracks or other deformities may occur. In addition, while the array substrate 110 is ground by the drill, small glass pieces or debris may scatter around the lens hole 150.

The lens hole guide 155 surrounds the lens hole 150 to minimize or suppress the array substrate 120 from being bent when physical impact is exerted on the array substrate 120, thereby reducing cracks in the array substrate 120. That is, the lens hole guide 155 can effectively absorb at least some of the impact, pressure or force exerted on the array substrate 110 during the process of forming the lens hole 150.

In addition, as the lens hole guide 155 surrounds the lens hole 150, it can block the glass pieces from scattering. Accordingly, the glass pieces or debris are restricted within the lens hole 150, such that it is more convenient to remove such debris or pieces in the lens hole 150 by using a tool, such as a suction means, for removing them.

With reference to FIG. 4, the inner diameter L4 of the lens hole guide 155 may be larger than the diameter L1 of the lens hole 150. With the above-described configuration, the lens hole guide 155 may be effectively prevented from coming into contact with the drill during the process of forming the lens hole 150 with the drill. Accordingly, damage to the lens hole guide 155 may be minimized.

Although the inner side of the lens hole guide 155 conforms to the lens hole 150, the outer side of the lens hole guide 155 may or may not conform to it and thus can have different shapes. For example, the periphery of the lens hole guide 155 may be a circular shape, a rectangular shape, a polygonal shape, a streamlined shape, etc.

The lens hole guide 155 and the measurement pattern 175 may overlap one another. With the above-described configuration, the measurement pattern 175 may cover the lens hole guide 155. Accordingly, it is possible to reduce the measurement error by the lens hole guide 155 during the process measuring the thickness of the array substrate 110 (having the measurement pattern 175) with the confocal sensor.

Specifically, the lens hole guide 155 may have a refractive index different from that of the array substrate 110 and may be optically transparent. This may result in measurement errors. It is to be noted that in the LCD device 100 according to the exemplary embodiment of the present disclosure, the lens hole guide 155 and the measurement pattern 175 may not overlap but may be spaced apart from each other.

The black matrix 130 covers at least a part of the color filter substrate 120 in the peripheral area PA. The black matrix 130 is disposed between the color filter substrate 120 and the lens hole guide 155. For example, the black matrix 130 may cover at least some portion of the measurement pattern 175. With the above-described configuration, the measurement pattern 175 may be covered by the black matrix 130. In addition, the black matrix 130 may cover the peripheral area PA. With the above-described configuration, light from the light source via the peripheral area PA can be effectively shielded, and that the measurement pattern 175 disposed around the lens hole 150 is hidden by the black matrix 130 such that external light is not undesirably reflected off the measurement pattern 175.

In the black matrix 130 on the color filter substrate 120 in the periphery area PA, the aperture 160 in line or aligned with the camera module 140 is formed.

The aperture 160 may be formed by patterning the black matrix 130. The diameter L5 of the aperture 160 may be determined based on the view angle θ of the camera module 140. For example, there may be a particular distance between the lens part 140a and the aperture 160. The distance is also associated with the thickness of the overcoat layer 135. That is, the aperture 160 may be configured so that it does not hide or obstruct the viewing angle θ of the camera module 140. If the aperture 160 hides or obstructs the viewing angle θ of the camera module 140, the camera module 140 cannot properly perform image capturing due to the covered part. However, it is to be noted that the aperture 160 may also be configured so that it hides a part of the viewing angle θ of the camera module 140.

The diameter L5 of the aperture 160 may be smaller than the diameter L1 of the lens hole 150. The center of the aperture 160 may be adjacent to or aligned with the center of the lens hole 150. With the above-described configuration, the aperture 160 may hide the rest of the camera module 140 without hiding the viewing angle θ. Accordingly, the unnecessary part of the camera module 140 is hidden by the aperture 160, such that the aesthetic design can be improved. It is to be noted that the LCD device 100 according to the exemplary embodiment of the present disclosure is not limited by that.

The overcoat layer 135 on the color filter substrate 120 in the peripheral area PA covers the black matrix 130 and the aperture 160. The overcoat layer 135 may reduce the step difference (or layer unevenness) between the black matrix 130 and the aperture 160 or may provide a flat surface. Further, the overcoat layer 135 may transmit light of the visible wavelength band.

The overcoat layer 135 may reduce the step difference between the black matrix 130 and the aperture 160 to have a gentle (or gradual) slope. However, light may be refracted by the gentle slope, and thus the viewing angle θ of the camera module 140 may not overlap the sloped surface.

Alternatively, the viewing angle θ of the camera module 140 may overlap the sloped surface, and a compensation value for compensating such distortion may be stored in a memory. It is to be noted that the LCD device 100 according to the exemplary embodiment of the present disclosure is not limited by the sloped surface of the overcoat layer 135, and that the distortion of the sloped surface can be ignored if it is trivial. In some embodiments of the present disclosure, the overcoat layer 135 may have a relatively flat surface.

The second polarization plate 125 covers the aperture 160 on the color filter substrate 120. The transparent portion 165 of the second polarization plate 125 may be in line or aligned with the aperture 160 on the color filter substrate 120.

The transparent portion 165 may be formed by bleaching or processing a portion of the second polarization plate 125. Accordingly, the transparent portion 165 has no polarization property. That is, the transparent portion 165 passes or transmits visible wavelength irrespectively of the polarization axis of the polarized light source. Accordingly, the transmittance of visible light is higher at the transparent portion 165 than at the rest portion of the second polarization plate 125. It is to be noted that the LCD device 100 according to the exemplary embodiment of the present disclosure is not limited by that.

The diameter L6 of the transparent portion 165 may be determined based on the viewing angle θ of the camera module 140. The diameter L6 of the transparent portion 165 may be larger than the diameter L5 of the aperture 160.

With the above-described configuration, the camera module 140 can effectively capture images through the transparent portion 165 of the second polarization plate 125.

In some embodiments of the present disclosure, the second polarization plate 125 may not cover the aperture 160.

In some embodiments of the present disclosure, the transparent portion 165 may be formed by patterning the second polarization plate 125. That is, the transparent portion may be formed by physically removing a part of the second polarization plate, instead of performing bleaching or the like.

The LCD device 100 according to the exemplary embodiment of the present disclosure, the lens hole 150 is formed in the array substrate 110 and that the camera module 140 is inserted into the lens hole 150, thereby reducing the overall thickness of the display device. In addition, by forming the measurement pattern 175, defects possibly occurring during the process of forming the lens hole 150 in the array substrate 110 can be effectively suppressed. In addition, by forming the lens hole guide 155, there is an effect that defects possibly occurring during the process of forming the lens hole 150 in the array substrate 100 can be suppressed. In addition, by forming the aperture 160 in the black matrix 130, the aesthetic design can be improved without affecting the viewing angle θ of the camera module 140. In addition, by forming the transparent portion 165 in the second polarization plate 125, the aesthetic design can be improved without affecting the viewing angle θ of the camera module 140.

Figure 5A:
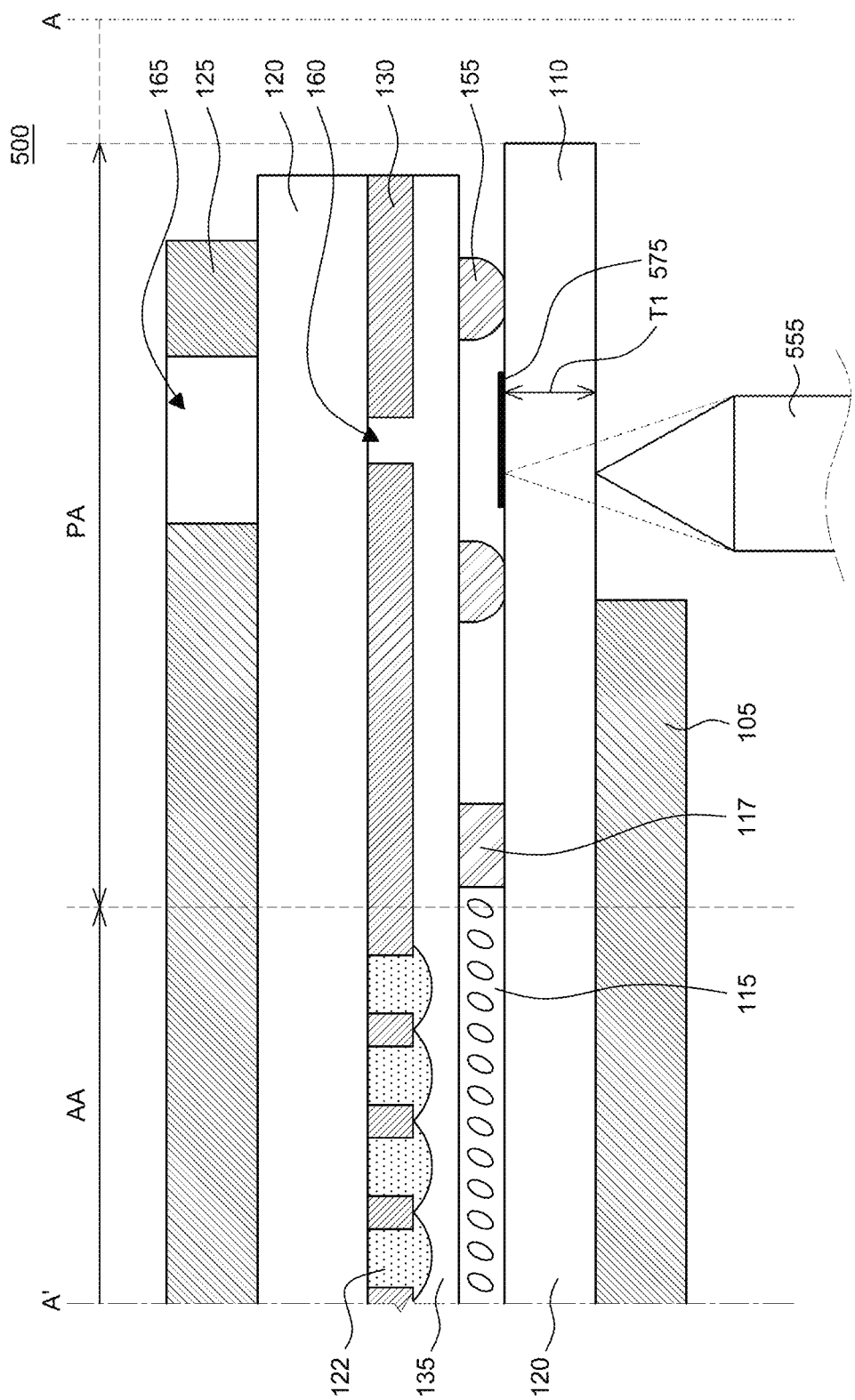
FIGS. 5A to 5C are cross-sectional views for illustrating a method for forming a lens hole of an LCD device according to another exemplary embodiment of the present disclosure.
Figure 5B:
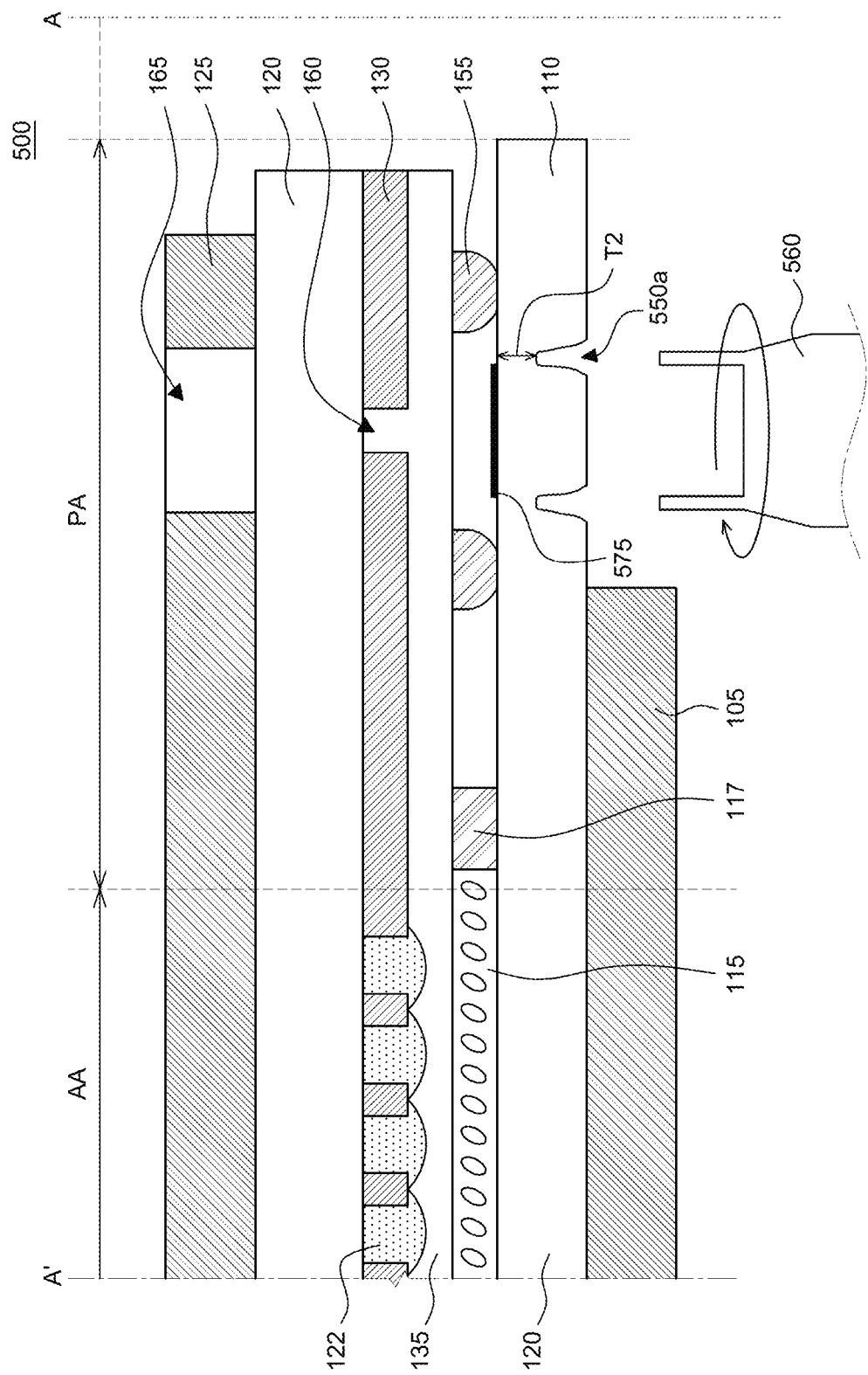
Figure 5C:
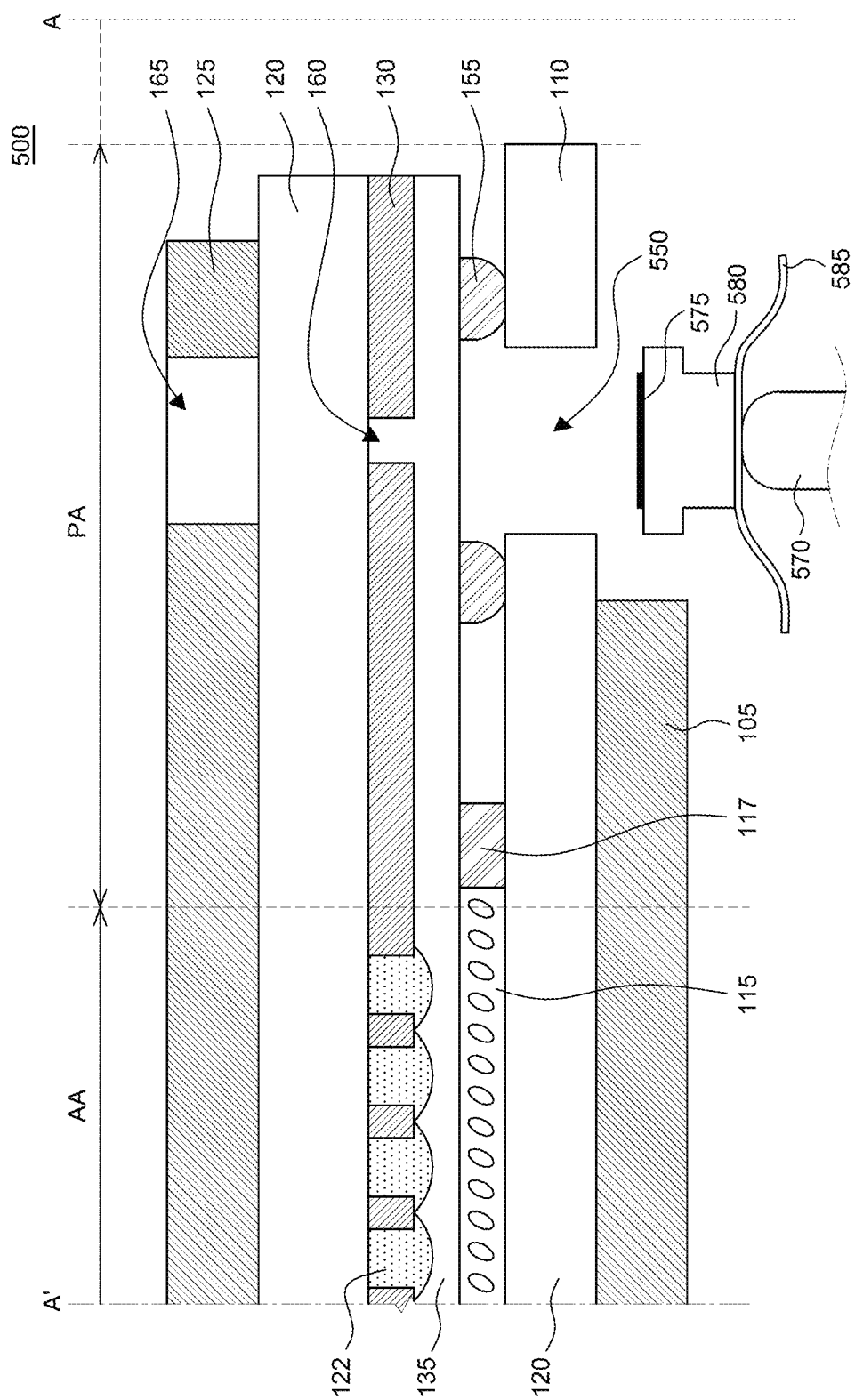

FIGS. 5A to 5C illustrate a method for forming a lens hole 550 of an LCD device 500 according to another exemplary embodiment of the present disclosure.

The LCD device 500 is different from the LCD device 100 in that a measurement pattern has a different configuration.

With reference to FIG. 5A, the thickness T1 of the array substrate 110 is measured with a confocal sensor 555 by using a measurement pattern 575 disposed on the array substrate 110 (step S510).

The thickness T1 of the array substrate 110 may be measured with the confocal sensor 555. To measure the thickness, the confocal sensor 550 focuses on the measurement pattern 575 disposed at a position where the lens hole 550 is to be formed. In this manner, the thickness T1 of the array substrate 110 can be measured more accurately than without such measurement pattern 575. For example, the measured thickness T1 of the array substrate 110 may be 250 μm.

With reference to FIG. 5B, based on the thickness T1 of the array substrate 110 measured with the confocal sensor 555, a groove 550a is formed at the position where the lens hole 550 is to be formed with a drill 560 to a particular depth (step S520).

To form the lens hole 550, the groove 550a is formed with a thickness that is thinner than the thickness T1 by the drill 560. If the thickness T1 of the array substrate 110 is equal to 250 μm, the depth of the groove 550a drilled by the drill 560 may be less than 250 μm. Specifically, the groove 550a may be formed to have a depth of about 95% to 99% of the thickness T1 of the array substrate 110. For example, the depth of the groove 550a may be 244 μm, and the thickness T2 of the remaining part of the array substrate may be 6 μm. With reference to FIG. 5C, adhesion force is applied on the area where the groove 550a is formed with a taping equipment 570 (or other element having adhesive characteristics) to attach the area to a glass core 580, and then the glass core 580 is separated from the array substrate 110 with the taping equipment 570 to form the lens hole 550 (S530). That is, a tape 585 is pressed by the adhesive taping equipment 570 against the top surface of the groove 550a formed with the drill 560, i.e., the glass core 580 so that the tape 585 is attached to the glass core 580. Subsequently, when the taping equipment 570 pulls down the tape 585 attached to the glass core 580 where the groove 550a is formed, the glass core 580 can be removed from the array substrate since the thickness T2 is very thin. As a result, the lens hole 550 can be formed. Subsequently, the camera module 140 is inserted into the array substrate 110 via the lens hole 550.

According to the above-described method of forming the lens hole 550, it is not necessary to penetrate the array substrate 110 with a drill. Accordingly, it is possible to greatly suppress the possibility that glass pieces created by the drill 560 are introduced between the array substrate 110 and the color filter substrate 120.

The exemplary embodiments of the present disclosure can also be described as follows:

According to an aspect of the present disclosure, a liquid-crystal display (LCD) device includes: an array substrate on which a sub-pixel is disposed; a color filter substrate on which a color filter corresponding to the sub-pixel is disposed; and a liquid-crystal layer between the array substrate and the color filter substrate. The array substrate comprises a lens hole, the color filter substrate comprises a lens hole guide, and a diameter of a lens hole is smaller than an inner diameter of the lens hole guide.

The center of the lens hole and a center of the lens hole guide may be configured to be adjacent to each other. An inner edge of the lens hole guide may be spaced apart from an edge of the lens hole.

The lens hole guide may be configured to surround the lens hole. The lens hole guide may absorb at least some of impact exerted on the array substrate during a process of forming the lens hole.

The color filter substrate may further include a black matrix. The black matrix may be disposed between the color filter substrate and the lens hole guide and may include an aperture smaller than a diameter of the lens hole, and the center of the aperture and the center of the lens hole guide may be configured to be adjacent to each other.

The color filter substrate may further include an overcoat layer. The overcoat layer may transmit a visible wavelength band, cover the black matrix and the aperture, and reduce step difference between the black matrix and the aperture.

The LCD device may further include: a camera module in an area of the array substrate other than the area where the sub-pixels are disposed, and the camera module may include a sensor part and a lens part, the lens part may be inserted into the lens hole and the lens hole guide, and the camera module may capture images via the aperture.

The LCD device may further include: a first polarization plate disposed under the array substrate; and a second polarization plate disposed on the color filter substrate. The second polarization plate may cover the aperture and comprises a transparent portion in line with the aperture.

The transmittance of visible light may be higher at the transparent portion than at the remaining portion of the second polarization plate.

The array substrate may further include a measurement pattern concentric with the lens hole.

The measurement pattern may be made of a material of a gate line and/or a material of a data line of the array substrate.

The measurement pattern may have a shape corresponding to the lens hole.

The inner diameter of the measurement pattern may be larger than the diameter of the lens hole.

The measurement pattern may be removed during a process of forming the lens hole.

The measurement pattern may be hidden by the black matrix.

The measurement pattern may have a circular ring shape or a donut shape.

According to another aspect of the present disclosure, there is provided a method of fabricating a liquid-crystal display (LCD) device. The method includes: measuring a thickness of an array substrate with a confocal sensor by using a measurement pattern on the array substrate; forming a groove in a position where a lens hole is to be formed to a depth determined based on the thickness of the array substrate measured with the confocal sensor; attaching a glass core to a region where the groove is formed by applying adhesion with a taping equipment, and then separating the glass core from the array substrate with the taping equipment to thereby form the lens hole; and inserting a camera module into the array substrate through the lens hole.

It will be apparent to those skilled in the art that various modifications and variations can be made in the camera module integrated liquid crystal display device and manufacturing method thereof of the present disclosure without departing from the scope of the invention. Thus, it is intended that the present disclosure cover the modifications and variations of this invention provided they come within the scope of the appended claims and/or their equivalents.

What is claimed is:

1. A display apparatus, comprising:
an array substrate having a pixel area and a peripheral area, the pixel area of the array substrate includes a pixel electrode and a switching element electrically connected to the pixel electrode, the peripheral area of the array substrate having an opening;
a first polarization plate disposed under the array substrate;
a second polarization plate disposed on the array substrate;
a lens hole guide which support the array substrate around the opening; and
a camera module inserted into the opening of the array substrate,
wherein a diameter of the opening is smaller than a diameter of the lens hole guide,
wherein the lens hole guide disposed on the array substrate and having a circular ring shape,
wherein the first polarization plate is disposed in an area excluding the camera module, and
the second polarization plate is disposed in an area excluding a lens part of the camera module.

2. The display apparatus of claim 1, further comprising:
a color filter substrate on the array substrate,
wherein the lens hole guide disposed between the array substrate and the color filter substrate.

3. The display apparatus of claim 1,
wherein the lens hole guide having a hole,
wherein a diameter of the opening is smaller than a diameter of the hole of the lens hole guide.

4. The display apparatus of claim 1,
wherein a center of the opening and a center of the lens hole guide are configured to be adjacent to or aligned with each other, and
wherein an inner portion of the lens hole guide is spaced apart from an outer portion of the opening.

5. The display apparatus of claim 1,
wherein the lens hole guide is configured to surround the opening.

6. The display apparatus of claim 1, comprising:
wherein the camera module comprises a sensor part and the lens part,
the lens part is accommodated by the opening and the lens hole guide, and
the camera module is configured to capture images.

7. The display apparatus of claim 2,
wherein the second polarization plate has a transparent portion corresponding to the opening.

8. The display apparatus of claim 7,
wherein the transparent portion is configured to be concentric with the opening.

9. The display apparatus of claim 7,
wherein a transmittance of visible light is higher at the transparent portion than at the remaining portion of the second polarization plate.

10. The display apparatus of claim 2, further comprising:
a black matrix between the color filter substrate and the lens hole guide.

11. The display apparatus of claim 10,
wherein the black matrix comprises an aperture smaller than a diameter of the opening, and a center of the aperture and a center of the opening are configured to be adjacent to or aligned with each other.

12. The display apparatus of claim 11,
wherein the color filter substrate further comprises a third layer disposed above the lens hole guide.

13. The display apparatus of claim 12,
wherein the third layer is configured to pass light of visible wavelength bands, to cover the black matrix and the aperture.

14. The display apparatus of claim 11,
wherein the black matrix further includes at least one aperture overlapping a liquid crystal layer.

* * * * *